United States Patent [19]

Hunt

[11] Patent Number: 4,852,435
[45] Date of Patent: Aug. 1, 1989

[54] PORTABLE FLANGE FACER

[75] Inventor: Christopher Hunt, Newberg, Oreg.

[73] Assignee: Climax Portable Machine Tools, Inc., Newberg, Oreg.

[21] Appl. No.: 83,631

[22] Filed: Aug. 10, 1987

[51] Int. Cl.⁴ .............................................. B23B 3/24
[52] U.S. Cl. ........................................ 82/113; 82/128
[58] Field of Search ............ 82/4 R, 4 C, 21 A, 21 R

[56] References Cited

U.S. PATENT DOCUMENTS

| | | | |
|---|---|---|---|
| 3,916,519 | 11/1975 | Gilmore | 82/4 C |
| 3,951,018 | 4/1976 | Gilmore | 82/4 C |
| 4,126,065 | 11/1978 | Clavin | 82/4 C |
| 4,411,178 | 10/1983 | Waghs et al. | 82/4 C |
| 4,656,898 | 4/1987 | Hunt | 409/233 |

OTHER PUBLICATIONS

Model 618 Flange Facer, Climax Portable Machine Tools, Inc., Newberg, Oreg., Aug. 9, 1988.

*Primary Examiner*—Frederick R. Schmidt
*Assistant Examiner*—Blynn Shideler
*Attorney, Agent, or Firm*—Dellett, Smith-Hill and Bedell

[57] ABSTRACT

A portable flange facer may be used to machine flange faces without removing the pipe from its installation thereby avoiding extensive disassembly and downtime. A stationary spindle, mounted centrally within the pipe bore, provides a structure about which a main body rotates. A motor, mounted upon the main body, and a gear means, coupling the motor to the stationary spindle, are used to rotate the main body about the spindle. A cutting element, mounted upon a turning bar slidable within the main body, may be moved radially inwardly and outwardly by manual or automatic means. The flange facer may be used to resurface a flange face or to form circular grooves therein.

28 Claims, 6 Drawing Sheets

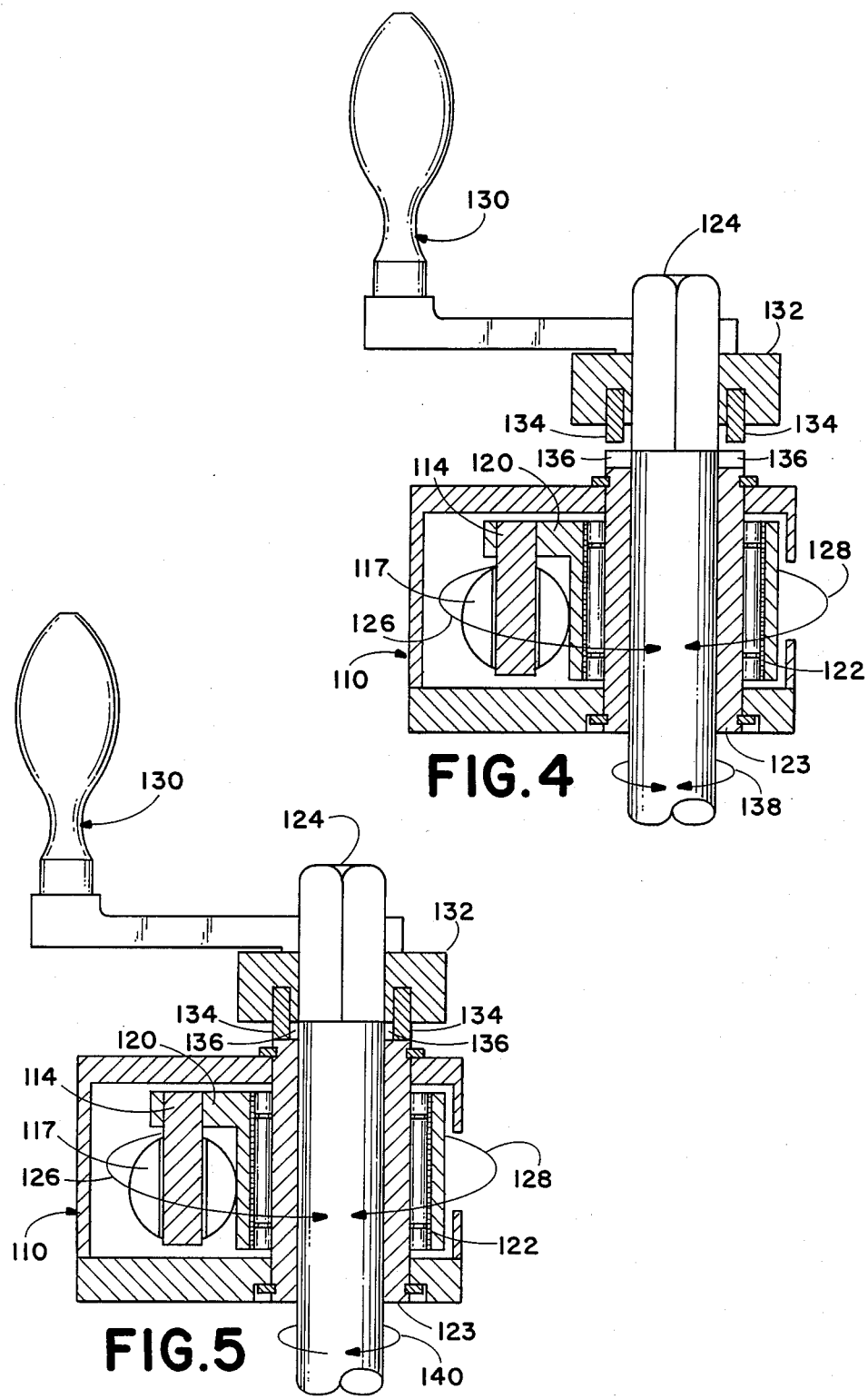

PORTABLE FLANGE FACER

BACKGROUND OF THE INVENTION

The present invention relates to portable lathes and in particular to portable flange facers.

Portable flange facers find application in a variety of areas including heat exchangers in power plants, fiberglass pipe flanges in chemical plants, hatch openings in shipyards, digester flanges in pulp mills, submarines, propeller hubs, large bull gears, and shoulders inside large pipes. In such applications, pipe flanges often need refacing or regrooving in order to repair deterioration of the flange face and prevent leakage caused by such deterioration. It is impractical to remove large pipes in order that they be taken to a machine shop for refacing and, as a result, portable flange facers have been developed to perform the refacing and regrooving in the field without removing the pipe from its installation. Such field repairs reduce downtime and extensive disassembly of the system under repair.

SUMMARY OF THE INVENTION

A portable flange facing apparatus for machining a pipe flange face comprises a spindle having mounting means integral therewith for mounting the spindle centrally within a bore of the pipe. The mounting means includes upper and lower chuck jaws slidable within the spindle and extensible therefrom for the purpose of contacting the interior of the pipe to be machined. A main body is rotatably mounted upon the spindle and caused to rotate about the spindle by a motor mounted upon the main body. A cutting element may be automatically fed radially outwardly or inwardly, during operation, i.e., during rotation of the main body about the spindle.

Accordingly, it is a primary object of the present invention to provide an improved portable lathe which may be used to machine a pipe flange face without the necessity of removing the pipe from its installation.

Another object of the present invention is to provide an improved portable lathe having a clamping mechanism integral with the spindle whereby the entire apparatus may be secured to a pipe without the need to first mount a separate clamping mechanism and then later mount the remainder of the lathe to the clamping mechanism.

Yet another object of the present invention is to provide an improved hydraulically driven automatic feed mechanism which may be conveniently used for either radial feeding or axial feeding of the cutting element.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DRAWINGS

FIG. 4 is a sectional view taken on lines 4—4 of FIG. 2 illustrating a feed slave unit utilized in the flange facer of FIG. 1;

FIG. 5 is a sectional view, similar to FIG. 4, illustrating the feed slave unit in a different operational position;

DETAILED DESCRIPTION

Figure 1:
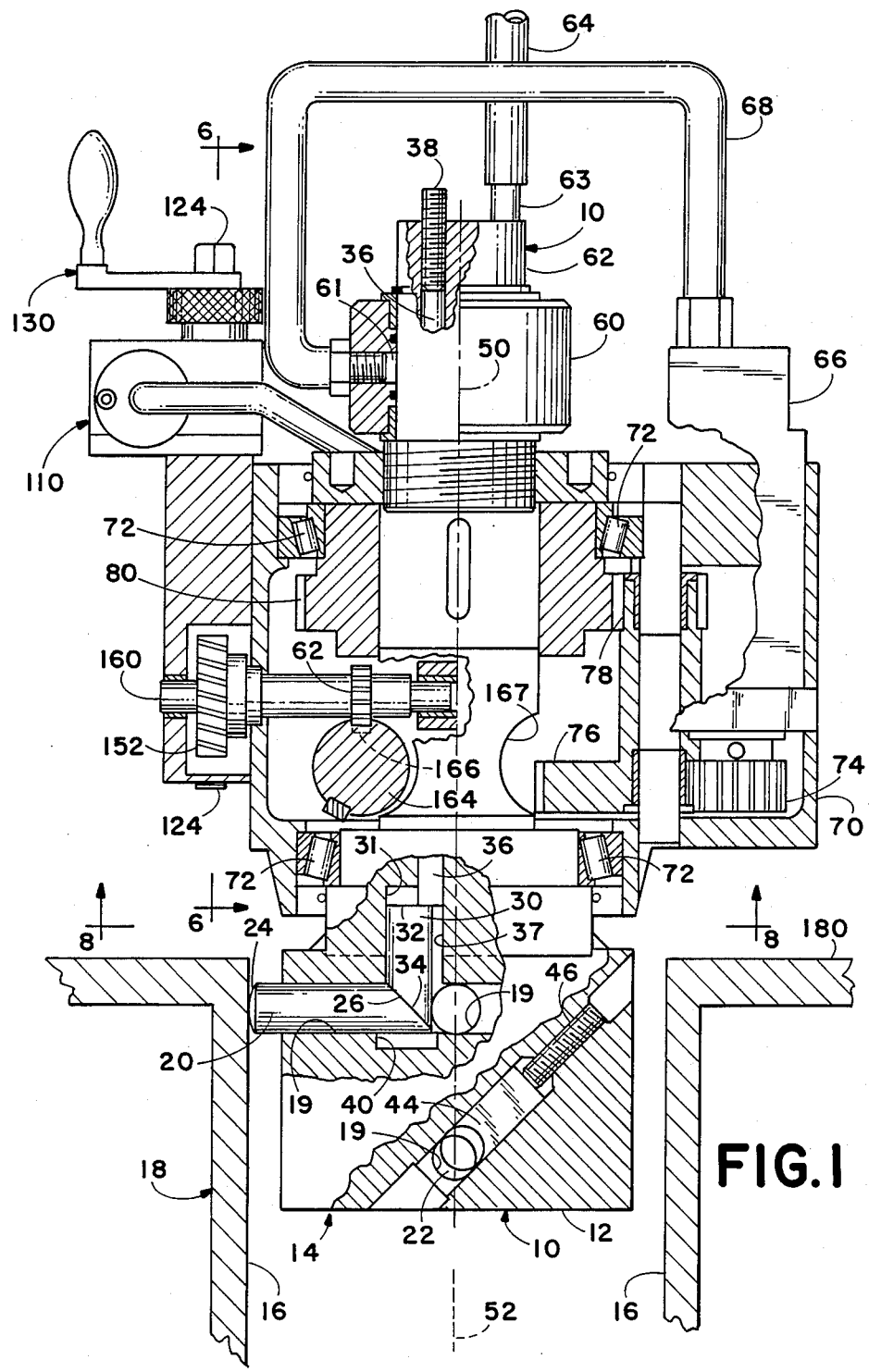
FIG. 1 is a side view partially cut away of a portable flange facer constructed in accordance with the present invention.
Figures 2, 3:
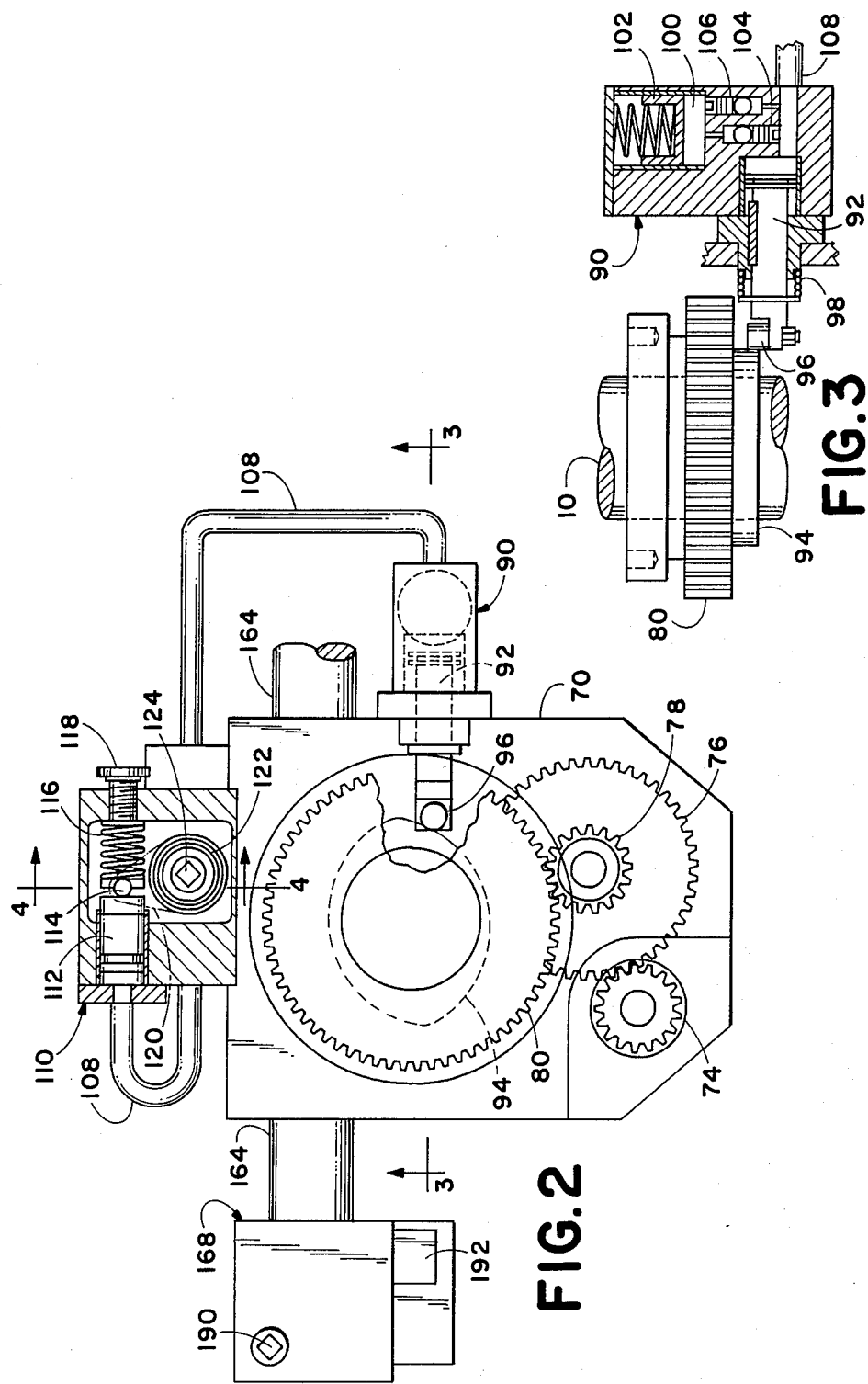
FIG. 2 is a top sectional view of the flange facer of FIG. 1.
FIG. 3 is a side view taken on lines 3—3 of FIG. 2 showing a portion of the flange facer of FIG. 2.

In reference to FIGS. 1-3 a portable flange facer according to one aspect of the present invention comprises a spindle 10 having at its lower end 12, and integral therewith, a mounting mechanism 14. Lower end 12 of spindle 10 is held within a bore 16 of pipe 18 by mounting mechanism 14 having upper clamp jaws 20 and lower clamp jaws 22 which are extended radially to contact the interior of pipe 18 in order to secure spindle 10 centrally within the bore 16 of pipe 18; the upper and lower clamp jaws 20 and 22 are horizontally and slidably disposed within bores 19 in spindle 10. In the presently described embodiment there are four upper clamp jaws and four lower clamp jaws; however, it is understood that a greater or lesser number of clamp jaws could be used without departing from the scope of the present invention. Further, the upper and lower clamp jaws are equiangularly distributed; however, such a relationship is not essential to operation of the present embodiment.

Upper and lower clamp jaws 20 and 22 are generally cylindrical, slightly rounded at an end 24 with which contact is made with the interior of pipe 18, and cut angularly, in this embodiment at 45 degrees, at an opposite end 26 interior to spindle 10. Upper jaw actuators 30 are vertically and slidably disposed within bores 31 in spindle 10, have a substantially flat upper end 32, an angularly cut lower end 34 similar to that of upper jaw clamps 20, and are positioned such that the lower end 34 of actuators 30 faces the end 26 of the corresponding upper jaw clamp 20.

Figure 8:
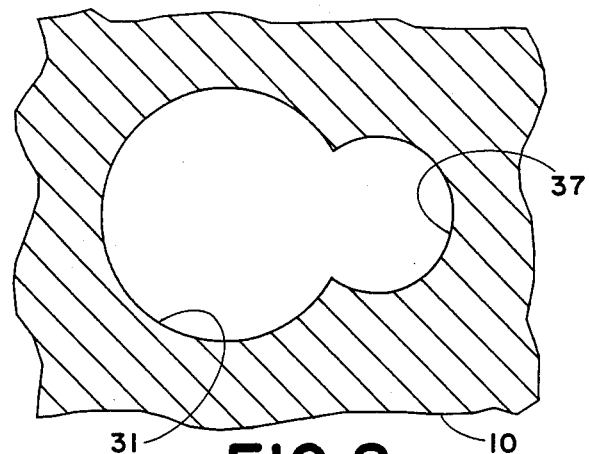
FIG. 8 is a sectional view taken along lines 8—8 in FIG. 1.

Forcing upper actuators 30 downward and against upper clamp jaws 20 causes upper clamp jaws 20 to move radially outward toward the interior of pipe 18. This forcing action is performed by push rods 36 which are vertically and slidably disposed within bores 37 in spindle 10, positioned to contact upper ends 32 of respective actuators 30, and moved vertically downward by upper jack screws 38 threadably engaged within spindle 10. Note, as is illustrated in FIG. 8, that the cross sections of bores 31 and 37 are overlapped in the area of actuators 30. Bores 31 are dimensioned such that actuators 30 may only move vertically. A recessed area 40 is provided for each of the upper jaw actuators 30 to allow actuators 30 to extend slightly below upper clamp jaws 20 thereby increasing the radial extension of jaws 20 in response to the downward motion of actuators 30.

Lower clamp jaws 22 are each spaced below and vertically aligned with a corresponding upper clamp jaw 20 and are caused to move radially outward by lower jaw actuators 44 in a manner similar to that of upper clamp jaws 20 except that lower jaw actuators 44 are angularly disposed within spindle 10 and are acted upon directly by lower jack screws 46 which are threadably engaged within spindle 10, i.e., no push rod is employed. Upper and lower clamp jaws 20 and 22 would suitably be provided in a variety of lengths corresponding to various pipe diameters.

Spindle 10 is secured centrally within the bore 16 of pipe 18 in a one step setup by selecting a set of upper and lower clamp jaws of suitable length, placing them within bores 19 of spindle 10, and placing the lower end 12 of spindle 10 within pipe 18. Proper adjustment of upper and lower jack screws 38 and 46 will result in alignment of a central axis 50 of spindle 10 with a central axis 52 of pipe 18 and will as well secure spindle 10 within the bore 16 of pipe 18. The upper clamp jaws 20 are set by turning upper jack screws 38, accessible at the top of spindle 10, while lower clamp jaws 22 are set by turning lower jack screws 46, accessible near the opening of pipe 18. When spindle 10 is secured in such manner to pipe 18 it may be considered to be stationary with respect to pipe 18, that is to say spindle 10 does not rotate with respect to pipe 18 but does provide a structure about which rotary portions, discussed hereinafter, of the flange facer may rotate.

A rotary union 60 is rotatably mounted on an upper end 62 of spindle 10 and employed to supply compressed air from an external air hose 64, via air fitting 63 rigidly affixed to spindle 10, to a pneumatic motor 66 via a bore (not shown) in spindle 10, an annular channel 61 defined between spindle 10 and rotary union 60, and a local air hose 68. Pneumatic motor 66 is mounted upon a main body 70 and used to rotate main body 70 about spindle 10 upon rotational bearings 72. Pneumatic motor 66 provides torque to a motor drive gear 74. As best seen in FIG. 2, motor drive gear 74 is meshed with a lower jack gear 76. Upper jack gear 78, rigidly affixed to and sharing a common axis of rotation with lower jack gear 76, is meshed with stationary bull gear 80 which is rigidly affixed to spindle 10. Actuation of pneumatic motor 66 results in rotation of main body 70 about spindle 10 while rotary union 60 prevents twisting of external air hose 64 during such rotation.

A feed pump 90, having a feed pump piston 92, is secured to the main body 70. A feed cam 94 fixed to spindle 10 acts upon a cam follower 96, attached to the feed pump piston 92, as main body 70 rotates about spindle 10 while the cam follower is held against the feed cam 94 by a follower return spring 98. Feed pump 90 suitably includes a reservoir 100 (FIG. 3), a spring loaded reservoir piston 102, a 1-2 psi refill check valve 104, and a 300 psi relief check valve 106. A hose 108 couples feed pump 90 and a removable feed slave unit 110. Feed slave unit 110 includes a slave piston 112. Pistons 92 and 112 move simultaneously due to their being coupled by hydraulic fluid in hose 108. A pin 114 is held against piston 112 by a return spring 116, having a spring cap 117. Spring 116 is disposed upon a feed rate adjustment knob 118 threadably engaged with feed slave unit 110. Cam 94 initially causes piston 92 to be moved to the right of FIG. 2, compressing spring 98 and causing piston 112 to move to the right of FIG. 2. Pin 114 is moved to the right, and spring 116 also is compressed. Subsequently, cam 94 allows follower 96 to move to the left, and spring 98 urges pistons 92 and 112 to the left. Spring 116 urges pin 114 to the left. The position of the feed rate adjustment knob 118 determines the extent to which pin 114 moves to the left of FIG. 2 when piston 112 moves to the left.

Pin 114 comprises an end of a lever arm 120 coupled, via a unidirectional roller clutch 122, to a sleeve 123 which is vertically and rotationally disposed within feed slave unit 110. As slave piston 112 moves back and forth in response to the flow of hydraulic fluid in hose 108 and the pressure of return spring 98, pin 114 is similarly caused to move back and forth. In response thereto roller clutch 122, being unidirectional, causes the sleeve 123 to rotate in only one rotational direction, clockwise as seen in FIG. 2. (In FIGS. 4 and 5, arrow 126 indicates the direction of rotation of arm 120 due to return spring 116 while arrow 128 shows the direction of rotation of arm 120 due to slave piston 112.) To disable rotation of sleeve 123 by the action of pin 114, knob 118 may be adjusted such that pin 114 is no longer held against piston 112.

In reference to FIGS. 4 and 5, a feed input shaft 124 is seen to be disposed rotationally within sleeve 123. Shaft 124 is provided with a removable crank handle assembly 130 for manual rotation thereof. Crank handle assembly 130 includes an engagement box 132 having pins 134 engageable within slots 136 on sleeve 123. Crank handle assembly 130 is slidable on feed input shaft 124 between a disengaged position, FIG. 4, and an engaged position, FIG. 5. In FIG. 4, sleeve 123 is disengaged from shaft 124 and crank handle assembly 130 may be used to rotate feed input shaft 124 in either rotational direction as indicated by arrows 138. In FIG. 5, sleeve 123 is engaged, by virtue of insertion of pins 134 within slots 136, with shaft 124. Manual rotation of feed input shaft 124 is thereby restricted by roller clutch 122 to a direction indicated by arrow 140.

Figure 6:
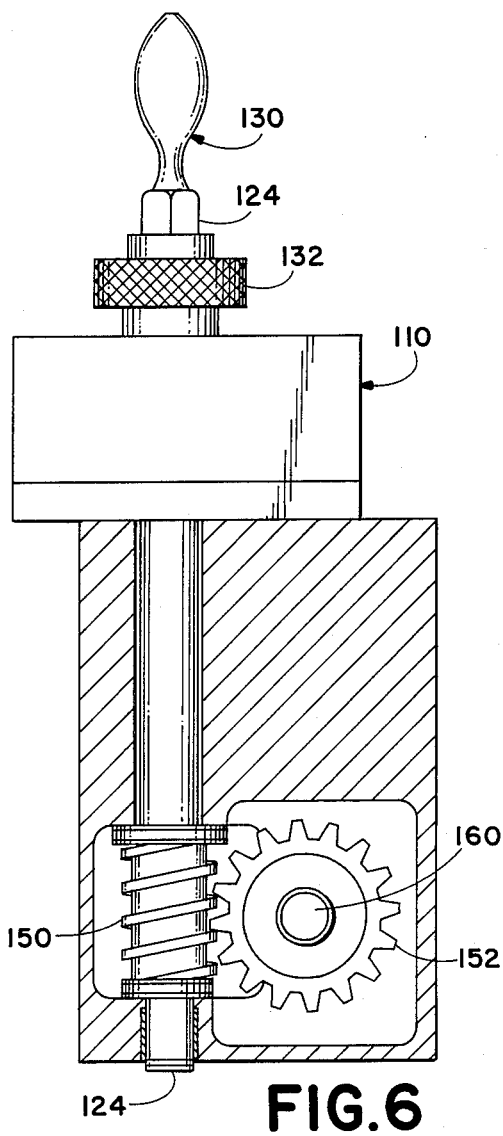
FIG. 6 is a sectional view of a portion of the feed mechanism of the flange facer of FIG. 1.

As best seen in FIG. 6, at an end opposite crank handle 130, feed input shaft 124 includes a feed worm 150 meshed with a feed worm gear 152. Feed worm gear 152 is mounted upon a pinion drive shaft 160. Rotation of feed input shaft 124, in either rotational direction, results in rotation of feed worm gear 152 and pinion drive shaft 160.

Figure 7:
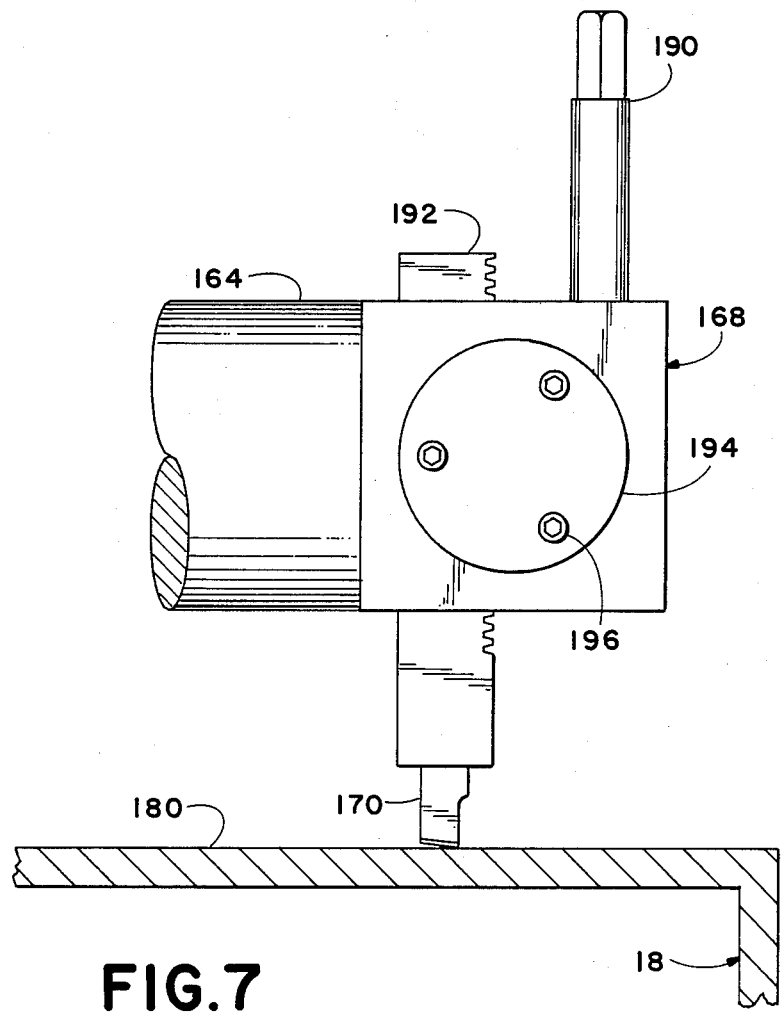
FIG. 7 is a side view of a tool head.

Returning to FIG. 1, pinion drive shaft 160 is rotatably disposed within main body 70 and has a pinion gear 162 mounted thereon. A turning bar 164 is slidably and horizontally disposed within main body 70 and has a longitudinal rack gear 166 formed therein, the rank gear 166 being meshed with the pinion gear 162. The diameter of spindle 10 is decreased in the vicinity of turning bar 164 to form a peripheral groove 167. Turning bar 164 is received in groove 167 so as to place turning bar 164 close to the central axis 50 of spindle 10. A tool head 168 (FIG. 2) is mounted upon an end of the turning bar 164 and secures a cutting element 170 (FIG. 7) thereat for the purpose of machining a flange surface 180. Radial positioning of the cutting element 170 is accomplished by rotation of feed input shaft 124. Specifically, rotation of feed input shaft 124 in a first direction causes the turning bar 164 to move rightward, as viewed in FIG. 2, while rotation of feed input shaft 124 in a second direction causes turning bar 164 to move leftward, as viewed in FIG. 2.

Referring again to FIG. 7, tool head 168 suitably includes a depth shaft 190 coupled by internal gear means (not shown) to a vertically disposed rack gear 192 having cutting element 170 mounted thereon. Depth shaft 190 is rotated to adjust the depth of cut, i.e., extension of cutting element 170 toward flange face 180. Rack gear 192 is mounted upon a rotatable member 194 which may be rotated to adjust the angle of cut and set in a particular position by set screws 196. Automatic down feed capability is provided by removing feed slave unit 110 and crank handle assembly 130 (FIG. 2) and mounting them on tool head 168. Feed slave unit 110 receives depth shaft 190 in a manner similar to that in which it receives feed input shaft 124 and causes depth shaft 190 to rotate automatically as main body 70 is rotated about spindle 10. In addition, crank handle assembly 130 may be utilized to manually turn depth shaft 190.

The feed slave unit 110 is adapted to be mounted at various locations on the portable lathe in order to provide automatic radial feeding and automatic axial feeding. Radial feeding is provided when the feed slave unit 110 communicates with feed input shaft 124 while axial feeding is accomplished by mounting the feed slave unit 110 on the depth shaft 190. Although the feed slave unit 110 is unidirectional in nature, it can be employed conveniently to provide selectively either outward or inward automatic radial feeding as well as either upward or downward automatic axial feeding. The feed slave unit 110 may be mounted in a non-inverted position to provide either outward radial feed or downward axial feed, or it may be flipped over to an inverted position, to reverse its output direction, to provide either inward radial feed or upward axial feed when coupled to the appropriate shaft. Thus, the versatility of the hydraulic feed system provides a multitude of functions while requiring but one feed source or feed pump.

To operate the portable flange facer, end 12 of spindle 10 is secured centrally within bore 16 of pipe 18 as hereinbefore described. This one step setup operation can be performed by an experienced operator in less than ten minutes. If a re-surfacing operation is to be performed, then the radial position of cutting element 170 is manually set to the inner diameter of the area to be resurfaced and the depth and angle of cut are set by appropriate adjustment of tool head 168. Feed rate adjustment knob 118 may be adjusted to set an infinitely variable feed rate within the range of 0 to 0.0813 centimeters per revolution. Actuation of pneumatic motor 66 causes rotation of main body 70 about spindle 10 as well as automatic and incremental outward radial movement of cutting element 170. When the radial position of cutting element 170 reaches the outermost diameter of the area to be resurfaced, then the operation may be repeated to effect a deeper cut or may be terminated if the previous cut resulted in satisfactory resurfacing of the flange face 180.

Grooves for O-rings and angle chamfers may be formed in flange face 180 by first selecting a suitable cutting element, adjusting the proper cut angle, and mounting the feed slave unit 110 on tool head 168, as hereinbefore described, for automatic down feed. Actuation of motor 66 then causes a circular groove to be formed in flange face 180 while the feed slave unit 110 automatically increments the depth of cut according to the current setting of adjustment knob 118.

Figure 9:
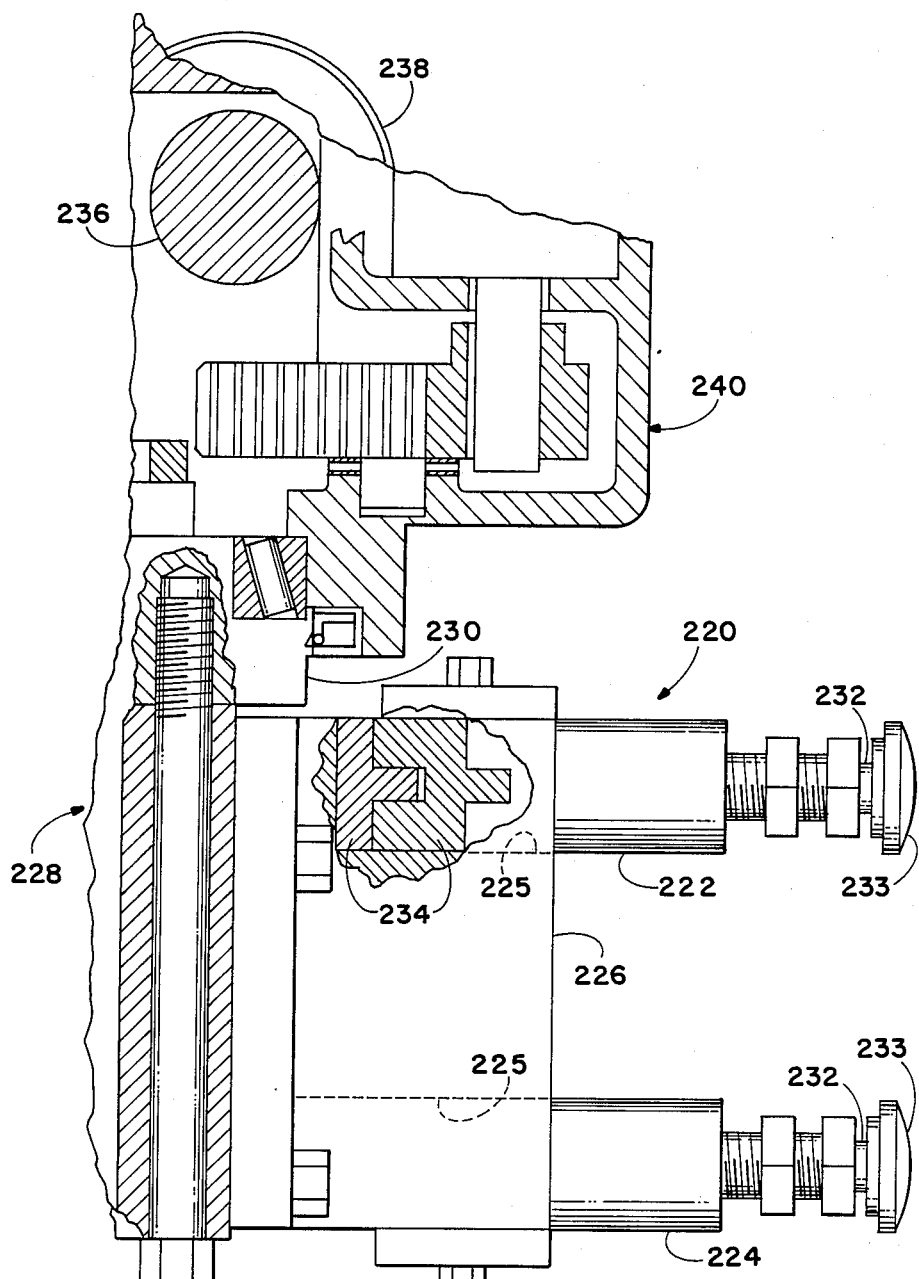
FIG. 9 illustrates an alternative embodiment of the present invention adapted for large diameter pipes.

In reference to FIG. 9, an alternative clamping mechanism 220 is suited for large diameter pipes and includes upper jaws 222 and lower jaws 224 which are slidable within radial bores 225 in a lower section 226 of a spindle 228. Lower section 226 is bolted to an upper section 230 of spindle 228. Each of upper and lower jaws 222 and 224 is provided, at its radial outer end, with a jacking bolt 232 threadably engaged therein and having a head 233. Jacking bolts 232 are adjustable to move heads 233 radially outward of spindle 228 to bear against the interior of a pipe (not shown) to be machined. Jaw spacers 234 may be inserted in bores 225 so as to radially extend the adjustable range of bolts 232. In this particular embodiment, there are four upper clamp jaws 222 and four lower clamp jaws 224 with both upper and lower clamp jaws being equiangularly distributed. However, such an arrangement is not essential to the operability of the lathe.

A balance arm 236 having a counter-weight 238, positionable along the length thereof, is horizontally and slidably disposed within a main body 240. The balance arm 236 allows smooth chatter-free turning while machining vertical flanges.

This second embodiment is in all other aspects, both structural and operational, substantially identical to the previously described embodiment with the exception of the modified clamping arrangement and the balance arm.

Although lower section 226 of spindle 228 is bolted to upper section 230 thereof, the portable flange facer is operated without detaching lower section 236 from upper section 230. Sections 226 and 230 are bolted together solely for ease of manufacture.

The portable lathe described herein has a number of advantages and among those advantages are the following: the feed rate is infinitely adjustable and thereby provides greater feeding precision, the lathe is compact and is therefore more readily adaptable for tight working space, and the motor and gearing are all completely inside the main body and are therefore protected from metal shavings and contaminants present on most work sites. By placing the motor on the main body and not on the spindle, the overall height of the lathe is reduced. Because all clamp jaws are individually adjustable in length, centering of the spindle is more easily accomplished. Also dual level clamping provides the spindle with greater rigidity when mounted inside the pipe bore. In either embodiment, there is no need to mount a separate clamping mechanism; the entire lathe is mountable in one step.

The flange facer, in either embodiment, may be operated in whatever vertical, horizontal or angular position is necessary on a flange face. It should be understood that reference herein to vertically and horizontally disposed elements and reference to element names such as upper and lower clamp jaws are for convenience and clarity.

While plural embodiments of the present invention have been shown and described, it will be apparent to those skilled in the art that many other changes and modifications may be made without departing from the invention in its broader aspects. The appended claims are therefore intended to cover all such changes and modifications as fall within the true spirit and scope of the invention.

I claim:

1. A portable lathe for machining a workpiece, said lathe comprising:
    a central spindle and clamping means therefor;
    a main body rotatable about said central spindle;
    means for rotating said main body about said central spindle;
    a cutting element carried by said main body and adapted to machine said workpiece;
    a feed cam integral to said central spindle;
    a radial feed shaft wherein rotation of said radial feed shaft causes said cutting element to move radially inwardly and outwardly with respect to said central spindle;

an axial feed shaft wherein rotation of said axial feed shaft causes said cutting element to move toward and away from said workpiece;

a feed pump having a feed pump piston connected to a cam follower held against said feed cam such that upon rotation of said main body about said central spindle said feed pump piston causes a flow of a hydraulic fluid in a conduit; and a feed slave unit coupled to said conduit and having a slave piston responsive to the flow of the hydraulic fluid in the hose and a clutch having a means held against said slave piston such that movement of said lever arm in response to said slave piston is translated into a unidirectional rotation via an output coupler;

wherein said output coupler is connectable to said radial feed shaft for automatic radial feeding of said cutting element or to said axial feed shaft for automatic axial feeding of said cutting element.

2. A portable lathe for machining a surface of a pipe, said lathe comprising:

a spindle including a feed cam and having mounting means integral therewith for mounting said spindle within a bore of said pipe;

a main body rotatably mounted upon said spindle;

means for rotating said main body about said spindle;

a cutting element for machining the surface of the pipe, said cutting element coupled to said main body such that rotation of said main body about said spindle also causes said cutting element to rotate about said spindle; and means for positioning said cutting element relative to said spindle, said positioning means being mounted upon said main body and including a cam follower held against said feed cam, said positioning means including means being responsive to said cam follower and adapted for repositioning.

3. A portable lathe for machining a workpiece, said lathe comprising:

a central spindle having a feed cam;

a main body rotatable about said central spindle;

means for rotating said main body about said central spindle;

a tool holder carried by said main body and adapted to receive a cutting element for machining said workpiece; and feed means responsive to rotation of said main body about said central spindle and adaptable by repositioning to perform feeding of said tool holder either radially of said spindle or longitudinally of said spindle, said feed means including a cam follower held against said feed cam.

4. A portable lathe according to claim 3, wherein said feed means comprise:

a longitudinal feed shaft wherein rotation of said longitudinal feed shaft affects the longitudinal position of said tool holder with respect to said spindle;

a radial feed shaft wherein rotation of said radial feed shaft affects the radial position of said tool holder with respect to said spindle;

a hose;

a feed pump connected to the hose and coupled to said cam follower for response to rotation of said main body about said spindle and for producing a flow of hydraulic fluid in the hose; and a feed slave unit connected to the hose and responsive to flow of hydraulic fluid in the hose and positionable to receive either said longitudinal feed shaft or said radial feed shaft to cause rotation thereof.

5. A portable lathe according to claim 4, wherein said feed slave unit, when receiving said radial feed shaft, is operable to rotate said radial feed shaft in one rotational direction resulting in an outward radial feed of said tool holder with respect to said spindle.

6. A portable lathe according to claim 4, wherein said feed slave unit, when receiving said longitudinal feed shaft, is operable to rotate said radial feed shaft in one rotational direction resulting in a longitudinal feed of said tool holder with respect to said spindle.

7. A portable lathe according to claim 4, wherein said feed slave unit is adjustable such that the amount of rotation of said radial feed shaft or said longitudinal feed shaft may be controlled.

8. A portable lathe device, comprising:

a spindle having a central axis;

a plurality of independently adjustable clamp jaws slidable within said spindle, at least one of said clamp jaws having an angularly cut end interior to said spindle; and actuator means for sliding the clamp jaws such that they may extend outwardly of said spindle to contact the interior surface of a bore, said actuator means comprising a jaw actuator angularly disposed with respect to said central axis and slidable within said spindle along a path to transverse said central axis, said jaw actuator having an angularly cut end set in opposition to the corresponding angularly cut end of said one clamp jaw such that a sliding action of said jaw actuator against said one clamp jaw is translated into a sliding movement of said one clamp jaw; and adjustment means for sliding said jaw actuator against said one clamp jaw.

9. The device according to claim 8, wherein said adjustment means comprises a screw threadably engaged within said spindle, contacting said jaw actuator, and in substantial alignment with said jaw actuator such that rotation of said screw causes said sliding action of said jaw actuator.

10. A portable lathe for machining a surface of a pipe, said lathe comprising:

a spindle including a feed cam and having mounting means integral therewith for mounting said spindle within a bore of said pipe;

a main body rotatably mounted upon said spindle;

means for rotating said main body about said spindle;

a cutting element for machining the surface of the pipe, said cutting element coupled to said main body such that rotation of said main body about said spindle also causes said cutting element to rotate about said spindle;

a cam follower held against said feed cam;

a feed input shaft rotatably disposed within said main body and wherein rotation of said feed input shaft in a first direction causes said cutting element to move radially inward and rotation of said feed input shaft in a second direction causes said cutting element to move radially outward;

means for manually rotating said feed input shaft selectively in either said first direction or said second direction; and means coupled to said cam follower for automatically rotating said feed input shaft.

11. A portable lathe according to claim 10, wherein said lathe further comprises:
- a turning bar disposed within said main body and slidable in a direction substantially perpendicular to said spindle;
- a tool head connected to an end of said turning bar and securing said cutting element thereat;
- a rack gear affixed longitudinally upon said turning bar;
- a pinion gear rotatably mounted upon said main body and meshed with said rack gear;
- a pinion drive shaft having said pinion gear mounted thereon and rotatably disposed within said main body such that upon rotation of said pinion drive shaft said turning bar is moved radially with respect to said main body;
- a feed worm gear mounted upon said pinion drive shaft; and
- a feed worm meshed with said feed worm gear, said feed worm gear mounted upon said feed input shaft.

12. A portable lathe according to claim 10, wherein said means for automatically rotating said feed input shaft comprises:
- a feed pump coupled to said cam follower and thereby responsive to the rotation of said main body about said spindle for producing a flow of a hydraulic fluid in a conduit; and
- a feed slave unit responsive to the flow of the hydraulic fluid and employed to cause said feed shaft to rotate in said second direction.

13. A portable lathe according to claim 12, wherein said feed pump comprises:
- a feed pump piston employed to produce the flow of the hydraulic fluid, said cam follower being affixed to said feed pump piston and held against said feed cam by a return spring such that said feed pump piston is responsive to said rotation of said main body about said spindle.

14. A portable lathe according to claim 12, wherein said feed slave unit comprises:
- a feed slave piston responsive to the flow of the hydraulic fluid in said conduit; and
- a roller clutch having a lever arm for receiving an input torque from said feed slave piston, said lever arm held against said feed slave piston by an adjustable return spring wherein the adjustable return spring determines the extent to which said lever arm may follow said feed slave piston.

15. The portable lathe according to claim 14, wherein the feed slave unit is positionable selectively in a first or second orientation for rotating the feed shaft in said first direction or said second direction.

16. The portable lathe according to claim 10, wherein said means for automatically rotating said feed input shaft includes means for rotating said feed input shaft selectively in either said first direction or said second direction in response to rotation of said main body about said spindle.

17. A portable lathe for machining a surface of a pipe, said lathe comprising:
- a spindle having a central axis and mounting means integral therewith for mounting said spindle within a bore of said pipe, said mounting means comprising a plurality of independently adjustable upper clamp jaws slidable within said spindle, a plurality of independently adjustable lower clamp jaws spaced axially of said spindle from said upper clamp jaws and slidable within said spindle, and means for sliding the upper clamp jaws and the lower clamp jaws such that they may extend outwardly of said spindle to contact the bore of the pipe, said means for sliding including a jaw actuator slidable along a path at an acute angle to said central axis;
- a main body rotatably mounted upon said spindle;
- means for rotating said main body about said spindle;
- a cutting element for machining the surface of the pipe, said cutting element coupled to said main body such that rotation of said main body about said spindle also causes said cutting element to rotate about said spindle; and
- means for positioning said cutting element radially of said spindle.

18. A portable lathe according to claim 1, wherein each of said plurality of independently adjustable upper clamp jaws and each of said plurality of independently adjustable lower clamp jaws has an angularly cut end interior to said spindle and wherein said sliding means comprises;
- a plurality of upper jaw actuators each slidable within said spindle along a path substantially parallel to said central axis and having an angularly cut end set in opposition to the corresponding angularly cut end of said upper clamp jaws such that a sliding action of said upper jaw actuators against said upper clamp jaws is translated into a sliding action of said upper clamp jaws;
- a plurality of lower jaw actuators each slidable within said spindle along a path transverse to said central axis and having an angularly cut end set in opposition to the corresponding angularly cut end of said lower clamp jaws such that a sliding action of said lower jaw actuators against said lower clamp jaws is translated into a sliding action of said lower clamp jaws;
- upper adjustment means for sliding said upper jaw actuators against said upper clamp jaws; and
- lower adjustment means for sliding said lower jaw actuators against said lower clamp jaws.

19. A portable lathe according to claim 18, wherein said plurality of independently adjustable upper clamp jaws is comprised of four clamp jaws equiangularly distributed about a central axis of said spindle, and wherein said plurality of independently adjustable lower clamp jaws is comprised of four clamp jaws each parallel with and spaced axially from a corresponding upper clamp jaw.

20. A portable lathe according to claim 18, wherein said upper adjustment means comprises:
- a plurality of push rods slidably disposed within said spindle and contacting said upper jaw actuators, said push rods being in substantial alignment with said upper jaw actuators;
- a plurality of upper screws threadably engaged within said spindle and engaging said push rods to cause said sliding action of said upper jaw actuators upon rotation of said screws.

21. A portable lathe according to claim 18, wherein said lower adjustment means comprises:
- a plurality of lower screws threadably engaged within said spindle, contacting said lower jaw actuators, and in substantial alignment with said lower jaw actuators such that rotation of said lower screws causes said sliding action of said lower jaw actuators.

22. A portable lathe according to claim 1, wherein said rotating means comprises:
   a motor means affixed to said main body;
   a bull gear affixed to said spindle; and
   gear means coupling said motor means to said bull gear such that upon operation of said motor means said main body is caused to rotate about said spindle.

23. A portable lathe according to claim 17, wherein said rotating means comprises;
   motor means affixed to said main body and having an output shaft;
   a motor drive gear mounted upon said output shaft;
   a jack gear rotatably mounted upon said main body and having an outer tooth set and an inner tooth set, said outer tooth set being meshed with said motor drive gear; and
   a bull gear affixed to said spindle, said bull gear being meshed with said inner tooth set of said jack gear such that upon rotation of said output shaft said main body is caused to rotate about said spindle.

24. A portable lathe device, comprising:
   a spindle having a central axis;
   a first set of four clamp jaws slidable within said spindle in directions perpendicular to said central axis, the clamp jaws of the first set being equiangularly distributed about said central axis, a first clamp jaw of the first set being independently adjustable with respect to a second clamp jaw of the first set;
   a second set of four clamp jaws slidable within said spindle in directions perpendicular to said central axis, the clamp jaws of the second set being axially spaced from the jaws of the first set and each jaw of the second set being slidable in a direction parallel to the sliding direction of a jaw of the first set, a first clamp jaw of the second set being independently adjustable with respect to a second clamp jaw of the second set; and
   actuator means for sliding the clamp jaws such that they may extend outwardly of said spindle to contact the interior surface of a bore, said actuator means including an actuator rod slidable along a path transverse to said central axis.

25. A portable lathe for machining a workpiece, said lathe comprising:
   a spindle having a central axis and a feed cam;
   clamping means for said spindle;
   a main body rotatable about said spindle;
   means for rotating said main body about said spindle;
   a tool holder carried by said main body and adapted to receive a cutting element for machining said workpiece; and
   feed means responsive to rotation of said main body about said central spindle and adaptable by positioning to perform either radial feeding of said tool holder or axial feeding of said tool holder, said feed means including a cam follower held against said feed cam.

26. A portable lathe according to claim 25, wherein said feed means comprises:
   an axial feed shaft wherein rotation of said axial feed shaft affects the longitudinal position of said cutting element with respect to said spindle;
   a radial feed shaft wherein rotation of said radial feed shaft affects the radial position of said cutting elements with respect to said spindle;
   a feed pump coupled to said feed cam for response to rotation to said main body about said spindle and producing a flow of hydraulic fluid in a conduit; and
   a feed slave unit responsive to the flow of hydraulic fluid in said conduit and adapted for repositioning to receive either said axial feed shaft or said radial feed shaft to cause rotation thereof.

27. A portable lathe according to claim 26, wherein said feed slave unit is positionable in a first orientation to rotate said radial feed shaft in one rotational direction resulting in an outward radial feed of said cutting element with respect to said spindle and is positionable in a second orientation to rotate said radial feed shaft in a second direction resulting in an inward radial feed of said cutting element with respect to said spindle.

28. A portable lathe according to claim 26, wherein said feed slave unit is adjustable such that the amount of rotation of said radial feed shaft and said axial feed shaft are controllable.

* * * * *

UNITED STATES PATENT AND TRADEMARK OFFICE
CERTIFICATE OF CORRECTION

PATENT NO. : 4,852,435
DATED : August 1, 1989
INVENTOR(S) : Christopher Hunt

It is certified that error appears in the above-identified patent and that said Letters Patent is hereby corrected as shown below:

Column 4, line 44, "rank" should be --rack--.

Column 6, line 20, "236" should be --226--.

Column 10, line 22, after "comprises", ";" should be --:--.

Column 11, line 10, after "comprises", ";" should be --:--.

Signed and Sealed this

Twenty-fifth Day of December, 1990

Attest:

HARRY F. MANBECK, JR.

*Attesting Officer*   *Commissioner of Patents and Trademarks*